May 10, 1966  R. F. TULLOCK  3,250,560
VEHICLE SIDE PROTECTOR AND METHOD OF MOUNTING THE SAME
Filed March 5, 1965 2 Sheets-Sheet 1
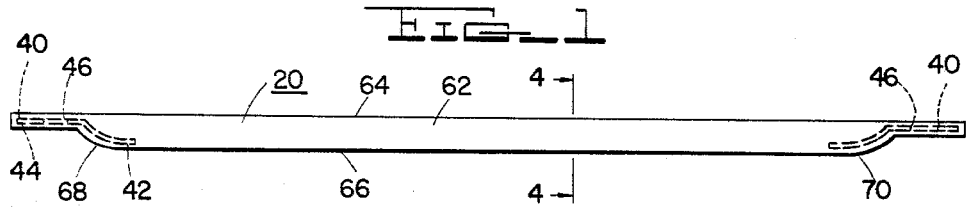
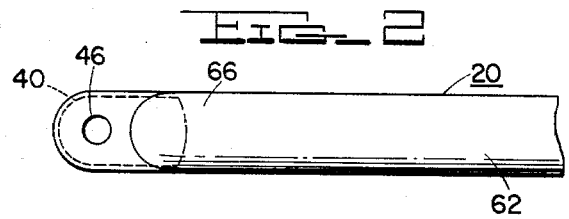
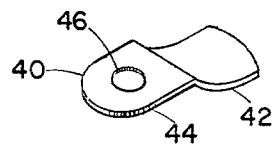
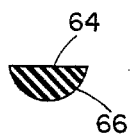
INVENTOR
ROBERT F. TULLOCK
BY
ATTORNEYS

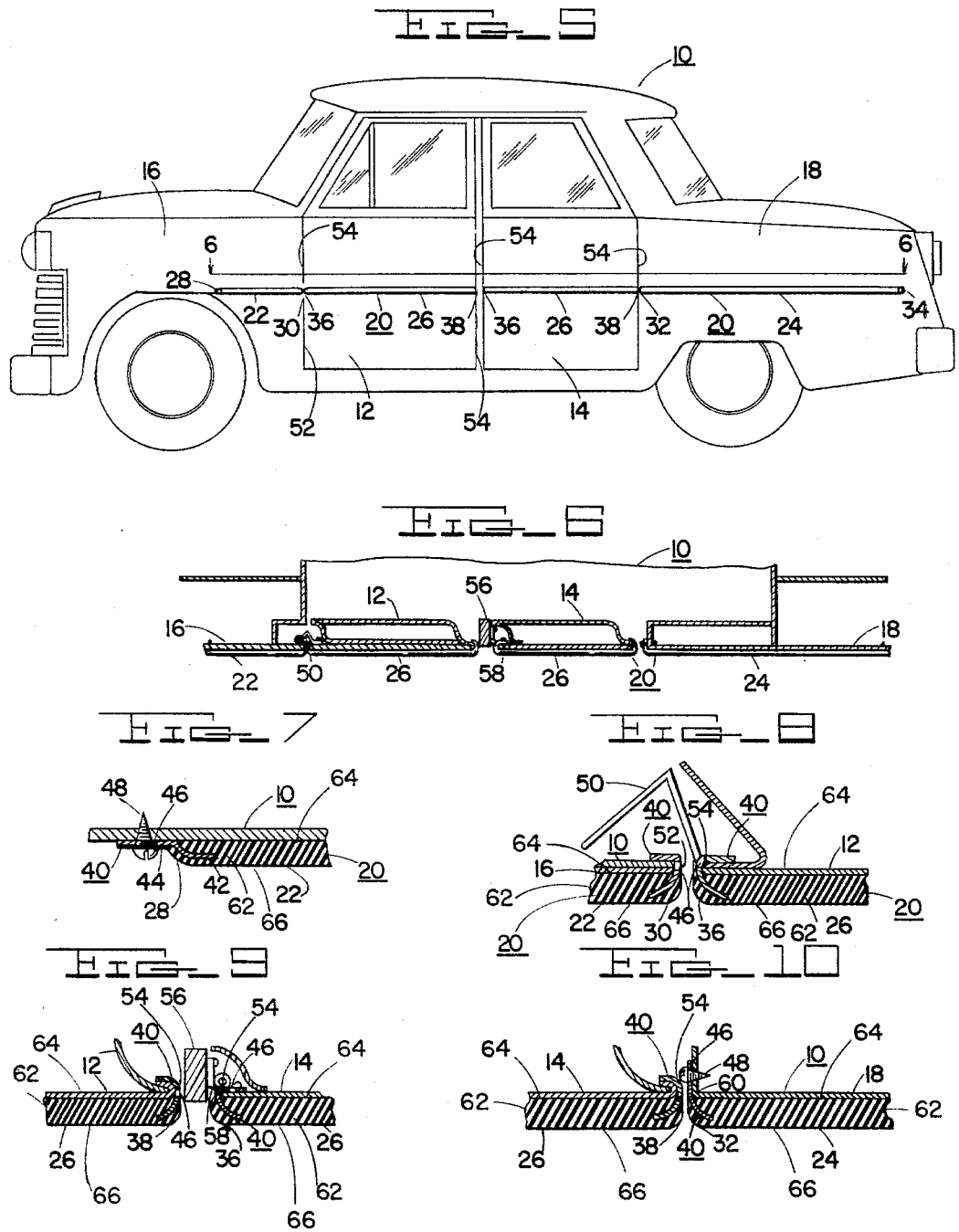

United States Patent Office 3,250,560
Patented May 10, 1966

3,250,560
VEHICLE SIDE PROTECTOR AND METHOD OF
MOUNTING THE SAME
Robert F. Tullock, 223 Henry Ave., New Haven, Ind.
Filed Mar. 5, 1965, Ser. No. 437,502
6 Claims. (Cl. 293—1)

This invention relates to an apparatus for protecting the sides of a vehicle and a method of mounting the same, and more particularly, an apparatus for protecting the sides of a vehicle from injury when the doors of adjacent vehicles are opened in a manner to strike the vehicle and a method for mounting the same on the sides of a vehicle.

It is therefore a primary object of this invention to provide an improved vehicle side protector and a method for mounting the same on the sides of a vehicle.

It is another object of this invention to provide a vehicle side protector which can be manufactured relatively inexpensively and a method by which the vehicle side protector of this invention can be mounted on the side of a vehicle relatively easily thereby to materially add to the appearance of the vehicle and at the same time to protect the vehicle.

A further object of this invention is to provide a vehicle side protector which is longitudinally stretchable and a method by which the vehicle side protector of this invention can be secured at the ends thereof to the sides of a vehicle in a stretched condition thereby to resiliently hold the unsecured portions of the vehicle side protector to the sides of the vehicle.

The above-mentioned and other features and objects of this invention and the manner of attaining them will become more apparent and the invention itself will be best understood by reference to the following description of an embodiment of this invention taken in conjunction with the accompanying drawings, wherein:

FIG. 1 is a side view of the improved vehicle side protector of this invention;

FIG. 2 is a fragmentary front view of the vehicle side protector shown in FIG. 1;

FIG. 3 is a perspective view of the metal tabs shown in FIGS. 1 and 2 in side and front views, respectively, embedded in the vehicle side protector of this invention adjacent to the opposite ends thereof;

FIG. 4 is a cross-sectional view of one embodiment of the vehicle side protector illustrated in FIGS. 1 and 2 taken substantially along the section line 4—4 as shown in FIG. 1;

FIG. 5 is a side view of a vehicle having the improved vehicle side protector of this invention mounted thereon;

FIG. 6 is a fragmentary and cross-sectional view of the left-hand side of the vehicle illustrated in FIG. 5 taken substantially along the section line 6—6 of FIG. 5 showing the vehicle doors and the portions of the automobile immediately forward and rearward thereof;

FIG. 7 is a fragmentary, cross-sectional and enlarged view of one of the extreme ends of the vehicle side protector of this invention as secured to the vehicle illustrated in FIGS. 5 and 6 taken substantially longitudinally of the protector and illustrating one method by which the vehicle side protector of this invention can be secured to the side of a vehicle;

FIG. 8 is a fragmentary, cross-sectional and enlarged view of the portion of the vehicle, illustrated in FIGS. 5 and 6, adjacent to the hinge of the front door;

FIG. 9 is a fragmentary, cross-sectional and enlarged view of the portion of the vehicle, illustrated in FIGS. 5 and 6, adjacent to the hinge of the rear door showing another method by which the vehicle side protector of this invention can be secured to the side of a vehicle; and FIG. 10 is a fragmentary, cross-sectional and enlarged view of the portion of the vehicle illustrated in FIGS. 5 and 6 adjacent to the rearward edge of the rear door, illustrating still another method by which the vehicle side protector of this invention can be secured to the side of a vehicle.

In the broader aspects of this invention there is provided a strip of stretchable material which is adapted to be secured to the side of an automobile in a stretched condition by the opposite ends thereof thereby resiliently holding the unsecured portions of the strip to the side of the vehicle. Also within the broader aspects of this invention there is provided a method for mounting the above-mentioned strips of stretchable material comprising the steps of providing a pair of metal tabs having a portion thereof embedded within the above-mentioned strips adjacent to the ends thereof and a second portion extending outwardly from the strips in opposite directions, respectively; securing one of the tabs to the side of a vehicle at a first position; stretching the strip generally horizontally of the vehicle; bending the second portion of the other tab into a hook-shape and fastening said other tab to a vehicle side at a second position, which is spaced apart from said first position a distance longer than the length of the strip before the sretching thereof by engaging the hook-shaped portion of the other tab to an edge of the vehicle facing longitudinally of said strip away from said first position.

Referring to the drawings, and more specifically to FIGS. 1 through 4, there is illustrated the improved vehicle side protector of this invention generally referred to by the reference numeral 20. The vehicle side protector 20 comprises an elongated strip 62 of resilient and stretchable material having a flat surface 64 and a curved surface 66 having a pair of metal tabs 40 secured at the opposite ends 68, 70. Strip 62 is of solid cross-section as shown in FIGS. 4 and 7 through 10. Each tab 40 has a flat portion 44 and a curved portion 42. Curved portions 42 of each of the metal tabs 40 are embedded in strip 62 at the opposite ends 68, 70, respectively. Portions 44 have one surface thereof lying in the plane generally defined by surface 64 and extend axially outwardly in opposite directions of the strip 62. Each of tabs 40 has an opening 46 in portion 44 through which a screw 48 or another type of fastener can be inserted and positioned therein as will be described hereinafter.

In the preferred embodiment, tabs 40 are made of sheet metal and formed into the shape illustrated in FIGS. 1, 2 and 3. However, tabs 40 can be fabricated of other materials and in other shapes so long as they can be bent during the performance of the method of this invention as described hereinafter and will remain permanently deformed in the shape bent. Portions 44 of tabs 40, if made of metal, are preferably coated with a protective material for the purpose of protecting the finish on the surfaces contacted by the tabs 40. The coating on portions 44 can be of the same material of which strip 62 is made. Further, strip 62 is preferably made of a rubber-like material that can be longitudinally stretched. Of the many kinds of natural or synthetic rubbers available that can be inexpensively formed into the shape of strips 62, no one kind has proven to be more desirable; however, neoprene has proven to be satisfactory.

Referring now specifically to FIG. 5 there is shown a vehicle 10 which is conventional in all respects and has front and rear doors 12, 14, respectively, and front and rear fender panels, 16, 18, respectively, to which the improved vehicle side protector of this invention 20 may be secured. Conventionally, each of the doors 12, 14 have opposite facing vertical edges 54 which are relatively thin and in each case thinner than the respective door 12, 14. Further, fender panels 16, 18 conventionally may have similar edges 52; however, only front fender panel 16 is shown in the figures to have an edge 54. Since each of the opposite sides of the vehicle 10 are identical and the vehicle side protector is secured thereto in an identical manner, only one side of the vehicle 10 is illustrated and hereinafter the description of mounting the vehicle side protector 20 to the vehicle 10 will refer only to one side of the vehicle 10 with the understanding that the vehicle side protector 20 is mounted to the opposite side (not shown in the figures) in the same manner.

To each side of the vehicle 10 there may be secured four lengths of the vehicle side protector 20; these four lengths will be referred to by reference numerals 22, 24 and 26, respective (the two lengths 26 being shown as identical). Each of the lengths 22, 24 and 26 are identical to the vehicle side protector, shown in FIGS. 1 through 4, and differ from each other only by the axial length of the respective lengths, however the means by which they are secured to the side of a vehicle 10, as will be hereinafter described with reference to FIGS. 7 through 10, will further distinguish the lengths 22, 24 and 26 from each other.

Referring specifically to FIG. 6, there is illustrated a sectional view of the left-hand side of the vehicle 10 including the front fender panel 16, the front door 12, the rear door 14, and the rear fender panel 18.

In combination, FIGS. 6, 7 and 8 show the elongated strip 22 secured to the front fender panel 16 of the vehicle 10 intermediate the front of the vehicle 10 and the front vehicle door 12. FIG. 7 illustrates the method of attaching end 28 of strip 22 to comprise the insertion of screw 48 through the opening 46 in the flat portion 44 of the tab 40 and securing the tab 40 to the side of the vehicle 10 adjacent to the front fender panel 16 by threadedly securing the screw 48 thereto. End 30 of strip 22 is prepared for attachment to an edge of the vehicle 10 adjacent to the hinge 50 of the front door 12 by bending flat portion 44 of the tab 40 secured to the strip 22 adjacent end 30 into a hook-shape. As shown in FIGS. 8, 9 and 10, tab 40 is bent transversely of strip 62 toward the surface 64 immediately adjacent to end 30 and longitudinally of strip 62 toward the center thereof. The tab 40, after being bent, is U-shaped with the transverse portion of tab 40 immediately adjacent to end 30. Strip 22 is then stretched and the hook-shaped tab 40 is engaged to the edge 52 of the front fender panel 16 and the tab 40 is hidden from view (see FIGS. 5 and 8). By securing the tab 40 adjacent end 28 of strip 22 at a position spaced from edge 52 a distance longer than the length of strip 22 before the stretching thereof, the hook-shaped tab 40 is frictionally secured to edge 52 in a manner hiding the tab 40 from view and the surface 64 of the strip 22 will be resiliently held against the side of vehicle 10 intermediate tabs 40 if the vehicle side is flat or outwardly curved.

Now referring to the securance of strip 24 to the rear fender panel 18, end 34 of the strip 24 is secured to the side of the vehicle 10 adjacent to the rear end thereof in the same manner as above-described with reference to end 28 of strip 22 and as shown in FIG. 7. Strip 24 is stretched to a position adjacent door 14 and the tab 40 adjacent end 32 is bent to extend perpendicularly inwardly from surface 64, as shown in FIG. 10. Screw 48 is then positioned in opening 46 of the tab 40 and the tab 40 is secured to the rear fender panel adjacent door 14 by threadedly securing the screw 48 thereto. Strip 24, like strip 22, is thus secured to the side of vehicle 10 in a stretched condition and thereby is resiliently retained in a horizontal position intermediate ends 32, 34 with its surface 64 adjacent to the side of the vehicle 10.

Referring now to strips 26 and to FIGS. 8, 9 and 10 which illustrate the means by which strips 26 are secured to the doors 12, 14, respectively, both strips are secured thereto in an identical manner. Therefore, only the securance of one of the strips 26 will be described. Prior to the securance of the strips 26, tabs 40 at ends 36, 38 of strip 26 are bent into a hook-shape as above-described in relation to strip 22. The strip 26 is then stretched and the hook-shaped tabs 40 are engaged with the opposite facing parallel edges 54 of the door, respectively, thus securing the strip 26 to the vehicle door in a stretched condition with the surface 64 being resiliently retained in position adjacent to the door.

Referring now to FIG. 5, it is shown to be preferable that strips 22, 24 and 26 be horizontally aligned in end to end relationship thereby to form a continuous length of resilient material extending from adjacent to the front end to adjacent to the rear end of vehicle 10. Each of the above-mentioned ends of the respective strips 22, 24 and 26 can be secured to the vehicle 10 in a variety of ways. Illustrated in FIGS. 6 through 10 and above-described are methods by which each of the ends of the strips 22, 24 and 26 can be secured to vehicle 10 and each strip end is adaptable to be secured in any of the ways illustrated. However, the particular manner used will vary depending upon the specific vehicle 10 on which the strips are desirably attached.

In the specific embodiment illustrated, the vehicle side protector 20 has a semi-circular cross-section having a radius of three-eighths inch, tabs 40 measure one and three-eighths inches in length and eleven-sixteenths inch in width; and strips 62 have lengths as above-mentioned that are slightly shorter than the distance between the positions to which the respective lengths of the vehicle side protector 20 are desirably attached.

In operation, the vehicle side protector 20 of this invention can be mounted on a vehicle 10 in a relatively easy manner. By providing that the initially flat portions 44 of the tabs 40 can be bent to conform to the portions where the vehicle side protector 20 is desirably secured, the tabs 40 can be secured to the vehicle either by screws 40 or by frictional means. Obviously, if the vehicle 10 were a two-door sedan, the operation would involve mounting only two strips 26 on the vehicle instead of the four strips 26 required for a four-door sedan. As aforementioned, the axial length of each of the strips 22, 24, 26 of the vehicle side protector 20 are determined by the distance between the positions on the vehicle 10 to which the the tabs 40 at the respective ends of the respective strips are desirably secured. In every case, the strips 22, 24 and 26 are provided with an axial length measured between the distal ends of tabs 40 that is smaller than the distance between the positions on the vehicle to which the ends of the strips are desirably secured; however, in every case, the strips 22, 24 and 26 are stretched to the length required without surpassing the elastic limit of the material from which the strips are made. This provides that each of the strips 22, 24 and 26 are secured to the sides of a vehicle in a stretched condition. Thus secured to vehicle 10, the vehicle side protector of this invention prevents doors of adjacent vehicles from damaging vehicle 10 when they are opened carelessly; and further adds to the appearance of the vehicle 10.

When desired, the vehicle side protector 20 and the respective strips 22, 24 and 26 can be colored in order to further enhance the appearance of the vehicle 10. In this respect, strips 22, 24 and 26 can be colored black, white or any other color, either to contrast with the color of the vehicle 10 or to match the color of the vehicle 10.

While there have been described above the principles of this invention in connection with specific apparatus, it is to be clearly understood that this description is made only by way of example, and not as a limitation to the scope of this invention.

What is claimed is:

1. A vehicle side protector comprising a one-piece elongated strip of resilient and stretchable material having front and rear surfaces, and elongated metal tab portions secured to the opposite ends, respectively, of said strip, each of said tab portions having a part of the length thereof embedded within said strip, the remaining part of the length of each tab portion extending beyond the respective strip end, at least one of said tab portions being manually bendable with respect to said strip for forming said one tab portion into a generally U-shape, said U-shape having a bight and two spaced apart overlapping legs, said bight being disposed immediately adjacent to the end extremity of the respective strip end and one of said legs being disposed in overlapping spaced relationship with respect to the rear surface of said strip, whereby said one tab portion may be substantially hidden from view when said strip is mounted on a vehicle door, and whereby said strip-end extremity prevents the edge of said door when opened from engaging the side of another vehicle.

2. The side protector of claim 1 wherein said one tab portion is formed into said U-shape.

3. The side protector of claim 2 in which the other tab portion is also formed into a U-shape for attachment to an edge portion of a vehicle.

4. The side protector of claim 2 in which the other tab portion is formed into an angular shape with said remaining part extending transversely to said strip.

5. The side protector of claim 1 wherein said rear surface is substantially flat.

6. The side protector of claim 3 further comprising a vehicle door with two generally vertically extending and oppositely facing edges, the distance between said edges being greater than the unstretched length of said strip, and wherein said U-shaped tab portions are respectively hooked over said edges thereby attaching said strip in a stretched condition to said door.

References Cited by the Examiner

UNITED STATES PATENTS

| | | | |
|---|---|---|---|
| 1,599,353 | 9/1926 | Albin | 267—74 |
| 2,354,700 | 8/1944 | Pezzano | 293—62 X |
| 2,730,396 | 1/1956 | Johnson | 293—71 |
| 2,805,058 | 9/1957 | Grant | 267—69 |
| 2,889,165 | 6/1959 | Zientara | 293—62 X |
| 3,131,960 | 5/1964 | Popp | 293—62 X |

FOREIGN PATENTS 689,935 7/1964 Canada.

ARTHUR L. LA POINT, *Primary Examiner.*

H. BELTRAN, *Assistant Examiner.*